(12) United States Patent
Hayakawa et al.

(10) Patent No.: US 6,213,448 B1
(45) Date of Patent: Apr. 10, 2001

(54) VALVE ELEMENT AND METHOD OF MANUFACTURING THE SAME

(75) Inventors: Tetsuya Hayakawa, Kariya; Masashi Tsurumi, Takahama, both of (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

(21) Appl. No.: 09/455,688

(22) Filed: Dec. 7, 1999

(30) Foreign Application Priority Data

Dec. 22, 1998 (JP) .................................................. 10-376391

(51) Int. Cl.[7] ...................................................... F16K 31/02
(52) U.S. Cl. ...................... 251/129.15; 251/337; 251/356
(58) Field of Search .............................. 251/129.15, 337, 251/356

(56) References Cited

U.S. PATENT DOCUMENTS

| | | | |
|---|---|---|---|
| 2,911,183 | * 11/1959 | Matthews et al. | 251/337 X |
| 3,921,670 | * 11/1975 | Clippard, Jr. et al. | 251/129.15 X |
| 4,732,362 | * 3/1988 | Morioka et al. | 251/129.15 X |
| 4,890,815 | * 1/1990 | Hascher-Reichl et al. | 251/129.15 X |
| 4,930,747 | * 6/1990 | Nakamura | 251/129.15 X |
| 5,158,263 | * 10/1992 | Shimizu et al. | 251/129.21 X |
| 5,374,029 | * 12/1994 | Bailey | 251/129.16 X |
| 5,964,446 | * 10/1999 | Walton et al. | 251/127 |
| 6,073,908 | * 6/2000 | Koga et al. | 251/337 |

FOREIGN PATENT DOCUMENTS

| | | | |
|---|---|---|---|
| 7145873 | 11/1993 | (JP) | F16K/31/06 |
| 8267262 | 3/1995 | (JP) . | |
| 8220265 | 8/1996 | (JP) | G12B/3/02 |

\* cited by examiner

*Primary Examiner*—Joseph A. Kaufman
*Assistant Examiner*—John Bastianelli
(74) *Attorney, Agent, or Firm*—McCormick, Paulding & Huber LLP

(57) ABSTRACT

A valve element comprising a leaf spring carrying a moveable core to open and close a valve seat in a solenoid valve. The leaf spring includes an outer peripheral ring section, a hub section with a central hole, connection holes, and a plurality of radial arm sections. An outer peripheral seal is arranged along the outer peripheral ring section. A valve disk is fitted to the hub section with a valve seal to contact the valve seat. A movable core with a flange section is on the outer surface of the hub section. A holder ring is connected to the valve disk through the connection holes which secures the movable core to the leaf spring.

6 Claims, 6 Drawing Sheets

VALVE ELEMENT AND METHOD OF MANUFACTURING THE SAME

BACKGROUND OF THE INVENTION

The present invention relates to a valve element adapted to be used in a solenoid valve and to a method of manufacturing thereof, such valve element having a disk-shaped leaf spring carrying a movable core fitted thereto.

Control valves for controlling the flow of fluid include flow rate control valves, direction control valves and pressure control valves. The flow rate control valve is designed to modify the flow rate of fluid by providing appropriate resistance to the flow by means of a valve element and the direction control valve is designed to allow or block a flow of fluid in a given direction to shift the direction of a flow of fluid also by means of a valve element, whereas the pressure control valve is adapted to regulate the pressure of the flow of fluid in a fluid circuit by means of a valve element. A solenoid valve is a kind of control valve having a valve element to be operated by means of a solenoid.

Known solenoid valves for controlling the flow rate of fluid flowing through a flow path include the one proposed in Japanese Patent Application Laid-Open No. 7-145873. The proposed solenoid valve comprises a valve housing having two ports and a valve element fitted to the valve housing, the valve element having a valve seal adapted to take an open position for opening a valve seat and allowing the two ports to communicate with each other or take a closed position for closing the valve seat and blocking the communication therebetween.

A solenoid coil is arranged in the valve housing in order to operate the valve element. A fixed core (fixed iron core) and a movable core (movable iron core) are arranged at the center of the coil so that the valve element may be opened and closed by means of the movable core. As valve elements capable of being operated by a movable core, there has been developed a valve element provided with such movable core fitted thereto. The valve element of this type typically comprises a disk-shaped leaf spring, an outer peripheral seal arranged at the outer periphery of the leaf spring, a valve seal arranged on one of the surfaces of the leaf spring in order to open and close the valve seat, and a movable core arranged on the other surface of the leaf spring.

The inventors of the present invention have studied valve bodies having a movable core fitted thereto as well as methods for manufacturing such a valve element. As a result of intensive research efforts, the inventors of the present invention invented a method of placing a leaf spring in a metal mold and molding fluorine rubber into an outer peripheral seal and a valve seal so that a movable core and a leaf spring can be held together by means of the valve seal.

However, the sealing effect of a valve element relative to a valve seat may be ensured when costly fluorine rubber is only used for the valve seal but the arrangement of rigidly holding the movable core in position by means of a fluorine rubber valve seal and preparing the valve seal and the outer peripheral seal simultaneously by molding requires the valve seal to have a large capacity. Then, such a valve seal can be prepared only by using a large volume of costly and heavy fluorine rubber to consequently raise the weight of the valve element and counter all the efforts for reducing the weight of the valve element. Additionally, any attempt for rigidly holding a movable core and a leaf spring together by means of fluorine rubber is accompanied by an insufficient holding strength. Then, the valve element would not be able to enjoy a long service life and the solenoid valve comprising such a valve element would lose reliability.

SUMMARY OF THE INVENTION

Therefore, an object of the present invention is to provide a highly reliable valve element that can be prepared with a reduced volume of costly fluorine rubber and hence at reduced cost and provide a method of manufacturing such a valve element.

Another object of the invention is to provide a lightweight valve element and a method of manufacturing such a valve element.

Still another object of the present invention is to provide a highly durable valve element wherein the leaf spring and the movable core are rigidly held together with an enhanced level of strength and provide a method of manufacturing such a valve element.

According to an aspect of the invention, the above objects and other objects are achieved by providing a valve element adapted to be arranged in a solenoid valve to open and close a valve seat and comprising a leaf spring including an outer peripheral ring section, a hub section having a central hole and one or more than one connection holes, and a plurality of radial arm sections for connecting between said outer peripheral ring section and said hub section, a ring-shaped outer peripheral seal formed by vulcanizing and molding an elastic material such as rubber along said outer peripheral ring section, a resin-made valve disk arranged on one of the opposite surfaces of said hub section of said leaf spring and adapted to receive a valve seal made of an elastic material such as rubber and held in contact with said valve seat, a movable core having at an end thereof a flange section held in contact with the other surface of said hub section and arranged on said opposite surface of said hub section and a resin-made holder ring brought into engagement with said end of said movable core and bonded to said valve disk by ultrasonic welding by way of said connection hole so that said movable core is fitted to said leaf spring by means of said valve disk and said holder ring to be assembled to be integral with said valve disk.

Said holder ring may be provided with one or more than one meltable projections held in contact with said valve disk by way of said one or more than one connection holes respectively. Alternatively, said valve disk may be provided with one or more than one meltable projections held in contact with said holder ring by way of said one or more than one connection holes respectively. Said holder ring is provided with a stepped section into which said flange section is put. Said valve disk and said holder ring are made of resin with an average specific gravity of less than 1.9 and apt to be ultrasonically welded. Said movable core is molded from a thin steel plate.

According to another aspect of the invention, there is provided a method of manufacturing a valve element adapted to be arranged in a solenoid valve to open and close a valve seat, comprising a step of preparing a leaf spring including an outer peripheral ring section, a hub section having a central hole and one or more than one connection holes and a plurality of radial arm sections for connecting between said outer peripheral ring section and said hub section, a step of forming a ring-shaped outer peripheral seal by vulcanizing and molding an elastic material such as rubber along said outer peripheral ring section, a step of preparing a resin-made valve disk with a central anchoring hole to be fitted to one of the opposite surfaces of said hub section, a step of preparing a movable core having at an end thereof a flange section to be held in contact with the other surface of said hub section and arranged on said opposite surface of said hub section, a step of preparing a resin-made holder ring to be fitted onto said movable core, a step of forming a valve seal including a main body section to be fitted to the front surface of said valve disk and a holder section to be fitted to the rear surface of said valve disk by vulcanizing and molding an elastic material such as rubber and a step of arranging said valve disk on one of the surfaces of said hub section and said flange section onto the other surface of said hub section to make them contact with each other and ultrasonically welding said valve disk and said holder ring while holding said holder ring in engagement with said movable core and in contact with said valve disk so that said movable core is fitted to said leaf spring by means of said valve disk and said holder ring to be made integral with said valve disk.

DETAILED DESCRIPTION OF THE PREFERRED EMBODIMENT

Figure 1:
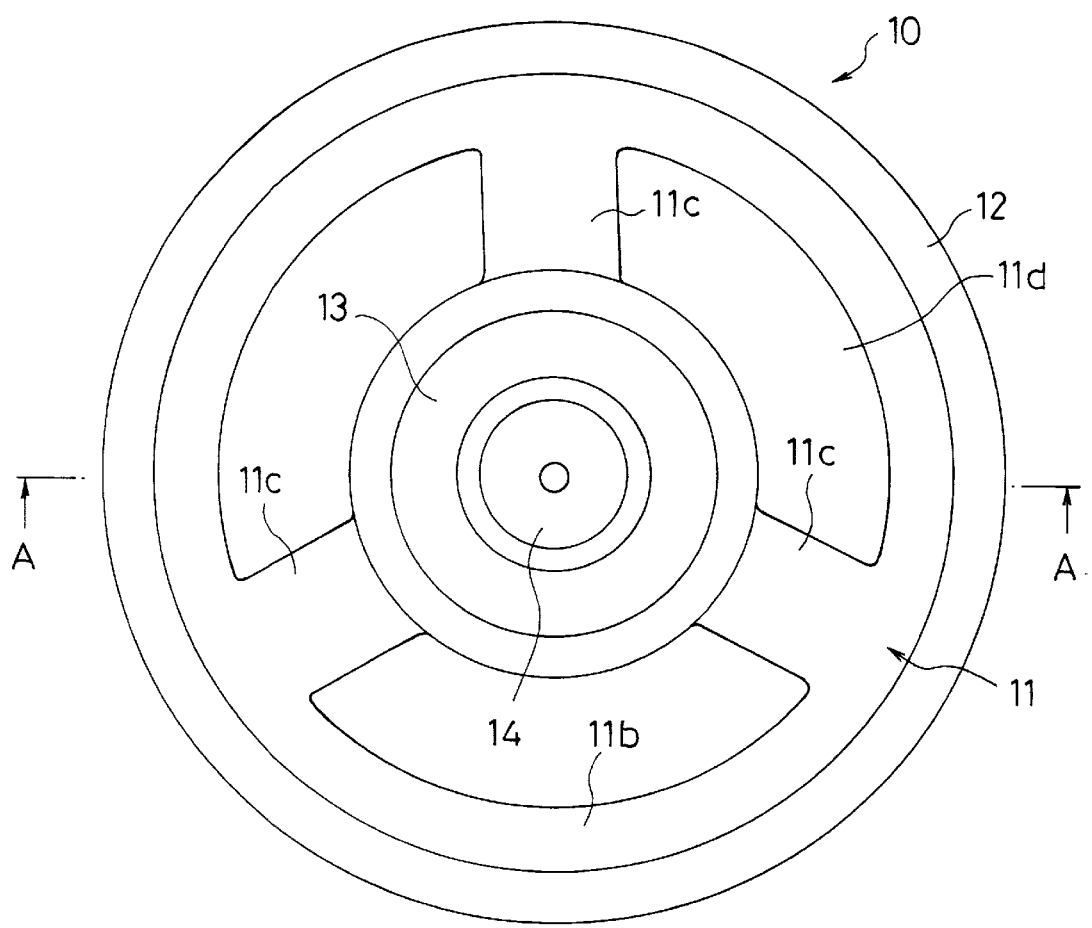
FIG. 1 is a schematic plan view of an embodiment of valve element according to the invention.
Figure 4:
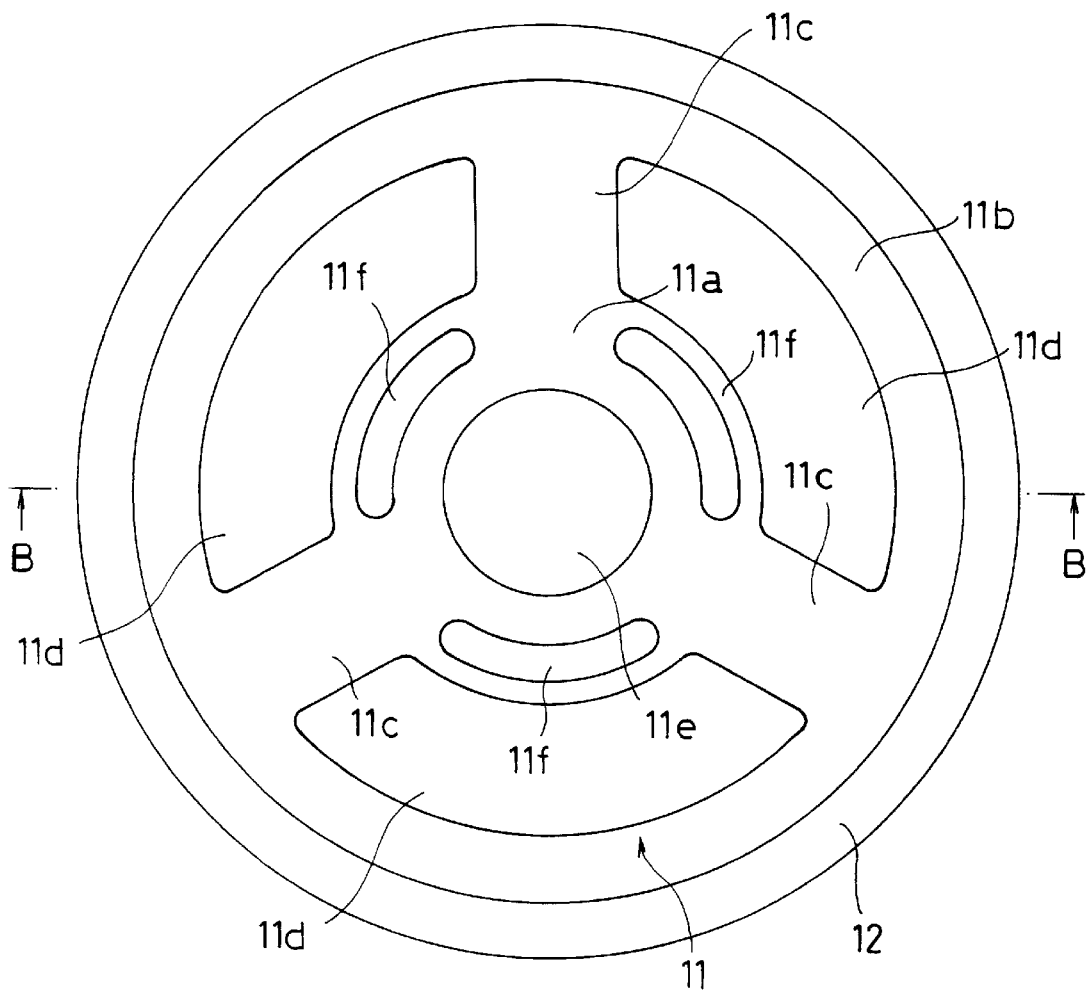
FIG. 4 is a schematic pan view of the disk-shaped leaf spring of the embodiment of FIG. 1 provided with an outer peripheral seal.
Figure 5:
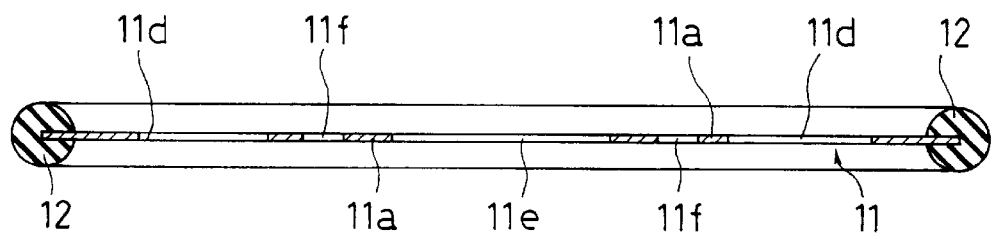
FIG. 5 is a schematic cross sectional view of the leaf spring taken long line B—B in FIG. 4.

Referring to FIG. 1 showing a preferred embodiment of valve element according to the invention, the valve element 10 comprises a disk-shaped leaf spring 11 made from a thin steel plate, which includes a center hub section 11a, an outer peripheral ring section 11b and a plurality of radial arm sections 11c connected to the hub section 11a and the outer peripheral ring section 11b, and a total of three openings 11d are formed between the hub section 11a and the outer peripheral ring section 11b as shown in FIGS. 4 and 5. A central hole 11e is cut through the hub section 11a and a total of three arcuate connection holes 11f are arranged around the central hole 11e.

An outer peripheral seal 12 having a substantially circular cross section is formed around the outer periphery of the leaf spring 11 by vulcanizing and molding an elastic material such as rubber and rigidly secured to the leaf spring 11. More specifically, the outer peripheral seal 12 is made of acrylonitrile-butadiene rubber (NBR). The valve element 10 is securely fitted to the valve housing of a solenoid valve as its outer peripheral seal 12 is held by the valve housing.

A resin-made valve disk 13 having an engaging hole 13a for engagedly receiving a valve seal 14 is fitted to one of the surfaces of the hub section 11a of the leaf spring 11. The valve seal 14 includes a main body section 14a to be fitted to one of the surfaces of the valve disk 13 and held in contact with the valve seat of the solenoid valve, a small diameter section 14c projecting to the back side of the main body section 14a and a large diameter holder section 14b connected to the main body section 14a by way of the small diameter section 14c and is adapted to be fitted to the valve disk 13 by vulcanization and molding.

The valve seal 14 is made of fluorine rubber, which is more expensive than NBR. However, for the purpose of the invention, the volume of expensive fluorine rubber necessary for molding is limited so that the valve element 10 can be manufactured at low cost because the valve seal 14 is fitted to the valve disk 13 and hence it is sufficient for the valve seal 14 to have a size large enough for sealing the valve seat.

Figure 6:
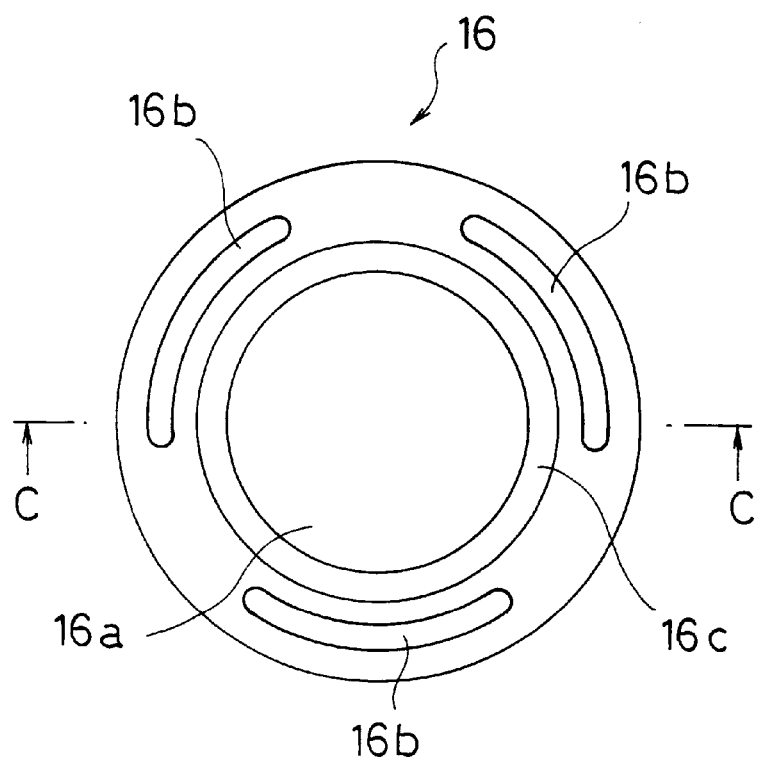
FIG. 6 is a schematic plan view of the holder ring shown in FIG. 2.
Figure 7:
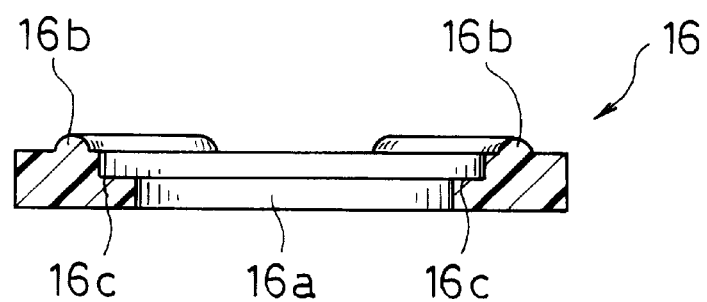
FIG. 7 is a schematic cross sectional view of the holder ring taken along line C—C in FIG. 6.

A metal-made cylindrical movable core 15 is arranged on the other surface of the leaf spring 11. The movable core 15 has a flange 15a arranged at an end thereof and a void chamber 15b in the inside for containing the spring therein when the valve element 10 is fitted to the solenoid valve. A resin-made holder ring 16 having a central insertion hole 16a is brought into engagement with the outer periphery of the movable core 15 at an end thereof in order to securely hold the movable core 15, the leaf spring 11 and the valve disk 13 together. As seen from FIGS. 6 and 7, a total of three arcuate meltable projections 16b are projecting from an end face of the holder ring 16 at positions corresponding to the respective connection holes 11f of the leaf spring 11 and a stepped section 16c is arranged along the inner periphery of the holder ring 16 so that it may be held in contact with the flange section 15a of the movable core 15. The meltable projections 16b have a height slightly greater than the thickness of the leaf spring 11.

The meltable projections 16b may alternatively be arranged on the valve disk 13 instead of the holder ring 16.

As the meltable projections 16b are held in contact with the valve disk 13 by way of the respective connection holes 11f under pressure, an ultrasonic vibration is applied to the valve disk 13 and the holder ring 16 by means of an ultrasonic welding machine. Then, as a result, the valve disk 13 and the holder ring 16 are bonded together to produce an integral unit by ultrasonic welding. Then, the movable core 15 is rigidly secured to the leaf spring 11 by means of the valve disk 13 and the holder ring 16 that are now integral with each other so that the valve element 10 can reliably operate for a prolonged period of life.

Materials that can be used for the valve disk 13 and the holder spring 16 include polyphenylenesulfide (PPS) having an average specific gravity of 1.3 and hence lighter than fluorine rubber having an average specific gravity of 1.9 and ABS resin having a specific gravity of 1.3. Thus, the valve element 10 can be made lightweight by using any of such materials.

The valve element 10 obtained in this way is a unitary assembly comprising a leaf spring 11 having an outer peripheral seal 12, a valve disk 13 having a valve seal 14, a movable core 15 and a holder ring 16 and hence can be handled as a single product. As a result, any defects that may be given rise to in the manufacturing process and/or during transportation can be addressed quickly.

Now, a method of manufacturing a valve element 10 according to the invention will be described by referring to FIGS. 1 through 7.

A leaf spring 11 including an outer peripheral ring section 11b, a hub section 11a having a central hole 11e and three connection hole 11f and three radial arm sections 11c connecting the outer peripheral section 11b and the hub section 11a is formed by press-molding using a press machine (not shown). Thus, the obtained leaf spring 11 shows a configuration as shown in FIGS. 1 through 7.

Figure 2:
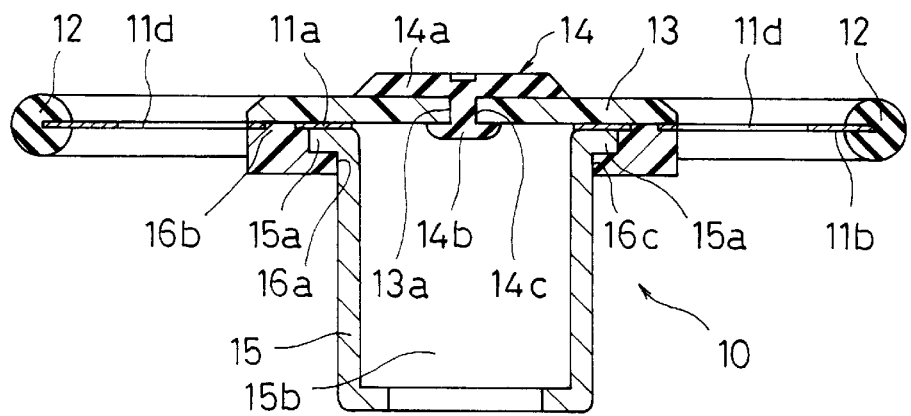
FIG. 2 is a schematic cross sectional view of the embodiment of FIG. 1 taken along line A—A in FIG. 1.
Figure 3:
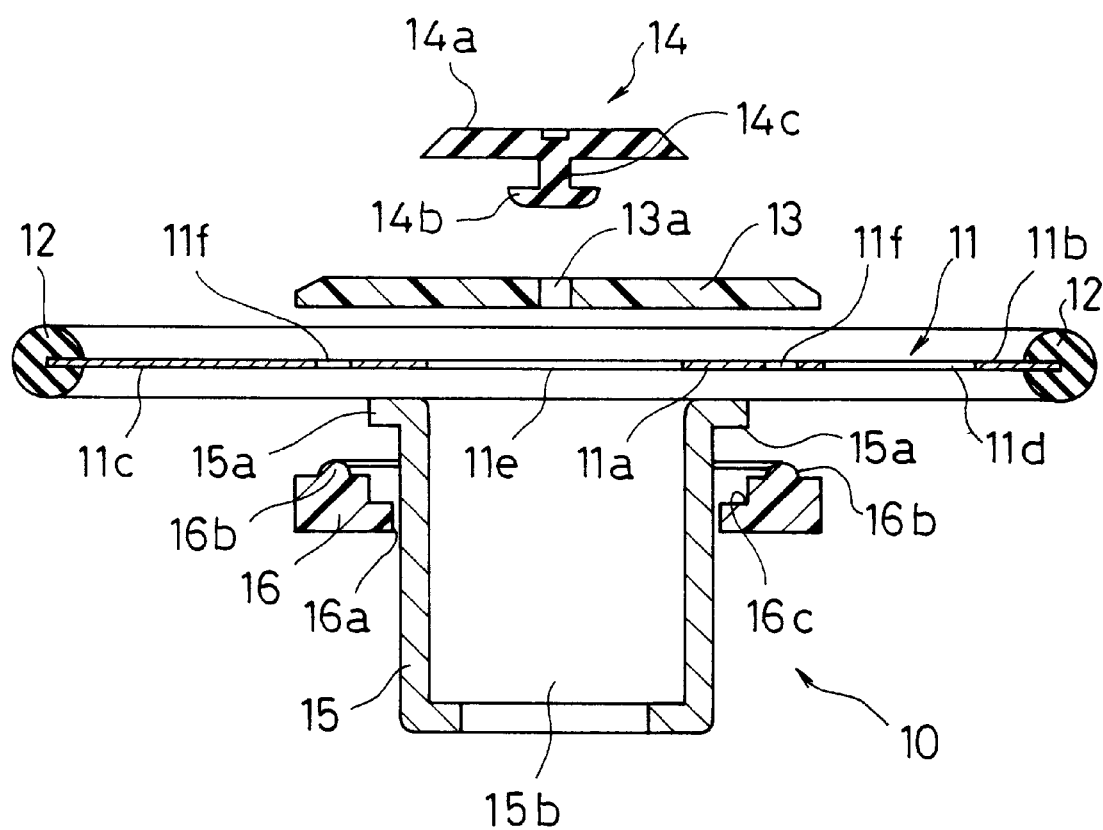
FIG. 3 is an exploded cross sectional view of the embodiment of FIG. 1, showing the components of FIG. 2 in a separated state.

A cylindrical movable core 15 having a flange section 15a at an end thereof is formed by press-molding a thin steel plate by means of another press machine (not shown). Thus, the obtained movable 15 having a cup-like cross sectional view as shown in FIGS. 2 and 3.

A valve disk 13 having a central anchoring hole 13a is formed by injection molding or some other molding technique, using a resin modelling metal mold (not shown). Meanwhile, an holder ring 16 having a central insertion hole 16 and meltable projections 16b arranged at an end face thereof is also formed by means of an injection molding technique as in the valve disk 13, using another resin molding metal mold (not shown).

An outer peripheral seal 12 is formed around the outer peripheral section of the leaf spring 11 by vulcanizing and molding an elastic material such as rubber, NBR for example using a rubber molding metal mold (not shown) arranged around the leaf spring 11. As a result, the outer peripheral seal 12 is manufactured to be rigidly secured to the leaf spring 11.

A valve seal 14 is formed on the opposite surfaces of the valve disk 13 in respective central areas thereof by vulcanizing and molding an elastic material such as rubber, fluorine rubber for example, in a rubber molding metal mold (not shown) arranged around the valve disk 13. As a result, the obtained valve seal 14 has a main body section 14a arranged on the front surface of the valve disk 13 and a large diameter holder section 14b arranged on the rear surface of the valve disk 13 connected mutually by a small diameter section 14c to form an integral entity.

Then, the holder ring 16 is placed in position by means of a jig (not shown) and the movable core 15 is inserted into the central insertion hole 16a of the holder ring 16 in such a way that the flange section 15a of the movable core 15 is aligned with the stepped section 16c of the holder ring 16. Then, the leaf spring 11 carrying the outer peripheral seal 12 is placed on the holder ring 16 in such a way that meltable projections 16b are put into the respective connection holes 11f. As a result, the three meltable projections 16b of the holder ring 16 come into contact with the lower surface of the valve disk 13 through the respective connection holes 11f. Under this condition, the three meltable projections 16b are welded to the rear surface of the valve disk 13 by means of an ultrasonic welding machine (not shown). Thus, the movable core 15 is secured to the leaf spring 11 by means of the valve disk 13 and the holder ring 16 integral with the valve disk 13.

Figure 8:
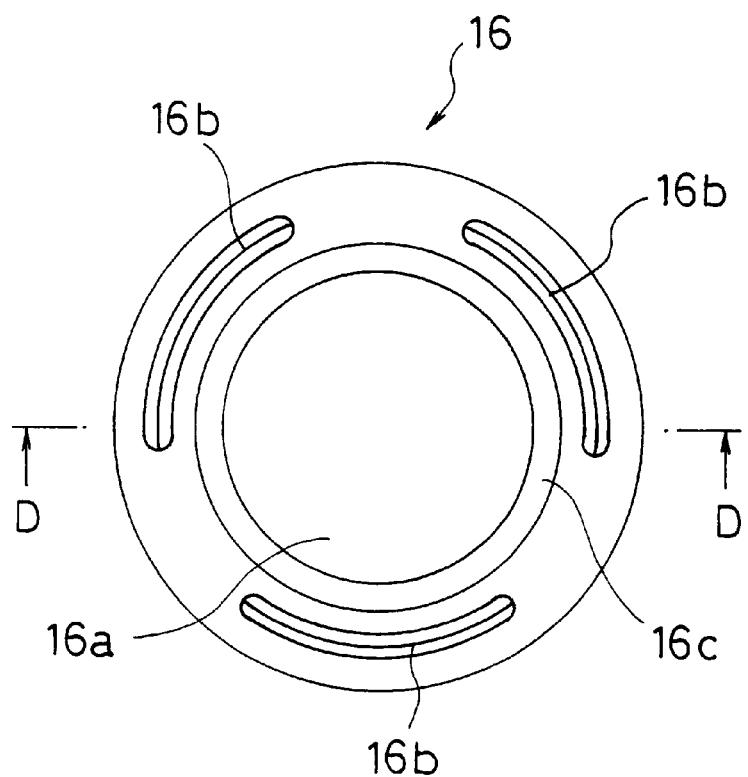
FIG. 8 is a schematic plan view of a holder ring obtained by modifying the holder ring of FIG. 6.
Figure 9:
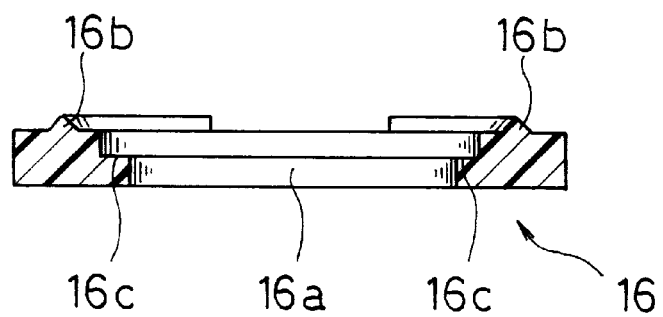
FIG. 9 is a schematic cross sectional view of the holder ring of FIG. 8 taken along line D—D in FIG. 8.

FIGS. 8 and 9 schematically show a holder ring 16 obtained by modifying the holder ring 16 of the above embodiment and having meltable projections 16b with a triangular cross section.

Figure 10:
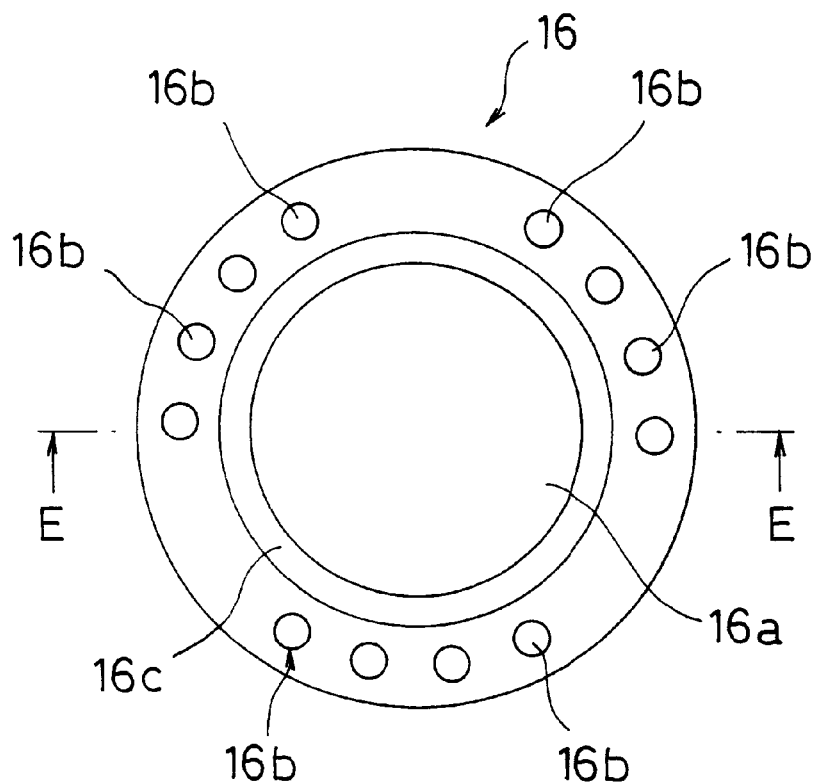
FIG. 10 is a schematic plan view of another holder ring also obtained by modifying the holder ring of FIG. 6.
Figure 11:
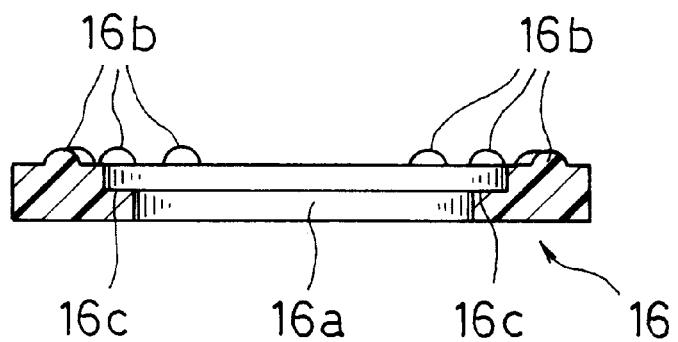
FIG. 11 is a schematic cross sectional view of the holder ring of FIG. 10 taken along line E—E in FIG. 10.

FIGS. 10 and 11 schematic show another holder ring 16 also obtained by modifying the holder ring 16 of the above embodiment and having meltable projections with a hemispherical cross section. The meltable projections 16b are divided into three groups, each including four meltable projections 16b.

In a valve element according to the invention, a leaf spring, a valve disk, a movable core and a holder ring are prefabricated and assembled together at the time of assembling the valve element so that they may be handled as many parts. As a result, any defects and/or damages that may be given rise to in the manufacturing process and/or during transportation can be addressed quickly.

The valve disk and the holder ring are made of resin with an average specific gravity of 1.9 or less so that the valve element can be made lightweight. The movable core is formed by press molding and hence the number of steps and the cost of manufacturing the movable core can be reduced when compared with its counterpart of FIGS. 12 and 13 that is prepared by cutting.

While the present invention is described above by way of a preferred embodiment thereof, the present invention is by no means limited thereto and the illustrated embodiment may be modified in various different ways without departing from the scope of the invention. For example, the valve seal 14 is made of expensive fluorine rubber in the above embodiment but it may alternatively be made of some other rubber. Similarly, while the leaf spring 11 has three radially arranged arm sections 11c in the above embodiment, any appropriate number of arm sections 11c may be used for the purpose of the invention. Likewise, while the leaf spring 11 and the holder ring 16 respectively have three connection holes 11f and three meltable projections 16b in the above embodiment, the number of connection holes 11f and that of meltable projections 16b are not limited to three and any appropriate number of connection holes 11f and meltable projections may be used for the purpose of the invention. The meltable projections 16b may be formed on the valve disk 13 instead of forming them on the holder ring 16.

What is claimed is:

1. A valve element adapted to be arranged in a solenoid valve to open and close a valve seat and comprising:

a leaf spring including an outer peripheral ring section, a hub section having a central hole and one or more than one connection holes, and a plurality of radial arm sections for connecting between said outer peripheral ring section and said hub section;

a ring-shaped outer peripheral seal formed by vulcanizing and molding an elastic material along said outer peripheral ring section;

a resin-made valve disk arranged on one of the opposite surfaces of said hub section of said leaf spring;

a valve seal made of an elastic material and adapted to be received in said valve disk to contact said valve seat;

a movable core having at an end thereof a flange section held in contact with the other surface of said hub section and arranged on said opposite surface of said hub section; and a resin-made holder ring brought into engagement with said end of said movable core and bonded to said valve disk by ultrasonic welding by way of said connection hole;

said movable core being thereby fitted to said leaf spring by means of said valve disk and said holder ring to be assembled to be integral with said valve disk.

2. A valve element according to claim 1, wherein said holder ring is provided with one or more than one meltable projections held in contact with said valve disk by way of said one or more than one connection holes respectively.

3. A valve element according to claim 1, wherein said valve disk is provided with one or more than one meltable projections held in contact with said holder ring by way of said one or more than one connection holes respectively.

4. A valve element according to claim 1, wherein said holder ring is provided with a stepped section into which said flange section is put.

5. A valve element according to claim 1, wherein said valve disk and said holder ring are made of resin with an average specific gravity of less than 1.9 and apt to be ultrasonically welded.

6. A valve element according to claim 1, wherein said movable core is molded from a thin steel plate.

* * * * *